US012251793B2

(12) United States Patent
Lin et al.

(10) Patent No.: US 12,251,793 B2
(45) Date of Patent: Mar. 18, 2025

(54) CENTERING VICE

(71) Applicants: Chang-Yi Lin, Taichung (TW); Chang-Chih Lin, Taichung (TW)

(72) Inventors: Chang-Yi Lin, Taichung (TW); Chang-Chih Lin, Taichung (TW)

( * ) Notice: Subject to any disclaimer, the term of this patent is extended or adjusted under 35 U.S.C. 154(b) by 322 days.

(21) Appl. No.: 17/891,743

(22) Filed: Aug. 19, 2022

(65) Prior Publication Data

US 2023/0114338 A1 Apr. 13, 2023

(30) Foreign Application Priority Data

Oct. 7, 2021 (TW) ................................ 110137380

(51) Int. Cl.
*B25B 1/10* (2006.01)
*B25B 1/24* (2006.01)

(52) U.S. Cl.
CPC ................ *B25B 1/103* (2013.01); *B25B 1/24* (2013.01)

(58) Field of Classification Search
CPC ......... B25B 1/103; B25B 1/10; B25B 1/2489; B25B 1/1478; B25B 1/2405; B25B 1/24; B25B 1/02; B25B 1/08; B25B 5/08
See application file for complete search history.

(56) References Cited

U.S. PATENT DOCUMENTS

| | | | | |
|---|---|---|---|---|
| 5,094,436 | A * | 3/1992 | Stephan, III | B25B 1/2478 269/154 |
| 5,531,428 | A * | 7/1996 | Dembicks | B25B 1/24 269/208 |
| 2018/0272499 | A1* | 9/2018 | Cheng | B25B 1/2489 |
| 2021/0107117 | A1* | 4/2021 | Hsu | B25B 1/103 |
| 2022/0305621 | A1* | 9/2022 | Rushlander | B25B 1/10 |

FOREIGN PATENT DOCUMENTS

| | | | | |
|---|---|---|---|---|
| DE | 102014112843 | A1 * | 3/2016 | B23Q 1/0072 |
| DE | 102014112845 | A1 * | 3/2016 | B25B 1/103 |
| DE | 102015119177 | A1 * | 5/2017 | |
| DE | 102019116262 | A1 * | 12/2020 | B23Q 1/0072 |

* cited by examiner

*Primary Examiner* — C. A. Rivera
(74) *Attorney, Agent, or Firm* — Muncy, Geissler, Olds & Lowe, P.C.

(57) ABSTRACT

A centering vice is provided, including: a base, a clamp assembly and an adjusting assembly. The base includes a sliding groove extending in a first direction and a first abutting portion. The clamp assembly includes a first jaw portion and a second jaw portion. The adjusting assembly includes a threaded rod, a positioning member and two adjusting members. The threaded rod includes a first threaded segment, a second threaded segment and a positioning portion. The positioning member is immovably connected to the positioning portion and disposed between the two adjusting members, and the two adjusting members respectively have a second abutting portion abutted against the first abutting portion. The two adjusting members are movable relative to the base in a second direction lateral to the first direction to urge the positioning member to move in the first direction.

8 Claims, 6 Drawing Sheets

CENTERING VICE

BACKGROUND OF THE INVENTION

Field of the Invention

The present invention relates to a centering vice.

Description of the Prior Art

A conventional vice is used to clamp a work piece and prevent the work piece from being unexpectedly moved during machining so as to have good machining accuracy. For example, a five-axis machine tool may be used with a centering vice. A conventional centering vice includes a main body and a threaded rod positioned on the main body, and the threaded rod has two moving seats screwed thereon. Each of the two moving seats is connected with a clamp so that the two moving seats are movable relative to each other along the threaded rod and said clamps can stably clamp the work piece.

However, the threaded rod of the conventional centering vice is fixedly mounted to the main body so that a clamping center of the said clamps cannot be adjusted to be aligned with a machining center of the five-axis machine tool, which results in poor machining accuracy. Some of the centering vice has an adjusting mechanism for adjustment of the clamping center, but a structure of the adjusting mechanism is complicated, which is inconvenient to manufacture and operate. The present invention is, therefore, arisen to obviate or at least mitigate the above-mentioned disadvantages.

SUMMARY OF THE INVENTION

The main object of the present invention is to provide a centering vice, which is convenient to be adjusted and provides good machining accuracy.

To achieve the above and other objects, the present invention provides a centering vice, including: a base, a clamp assembly and an adjusting assembly. The base includes a sliding groove extending in a first direction and a first abutting portion. The clamp assembly includes a first jaw portion and a second jaw portion which are movable relative to each other in the first direction. The adjusting assembly is disposed within the sliding groove and includes a threaded rod, a positioning member and two adjusting members. The threaded rod includes a first threaded segment, a second threaded segment and a positioning portion. The first jaw portion and the second jaw portion are connected respectively to the first threaded segment and the second threaded segment, and the positioning member is immovably connected to the positioning portion and disposed between the two adjusting members. The two adjusting members respectively have a second abutting portion abutted against the first abutting portion. The two adjusting members are at least partially movable relative to the base in a second direction lateral to the first direction to urge the positioning member to move in the first direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
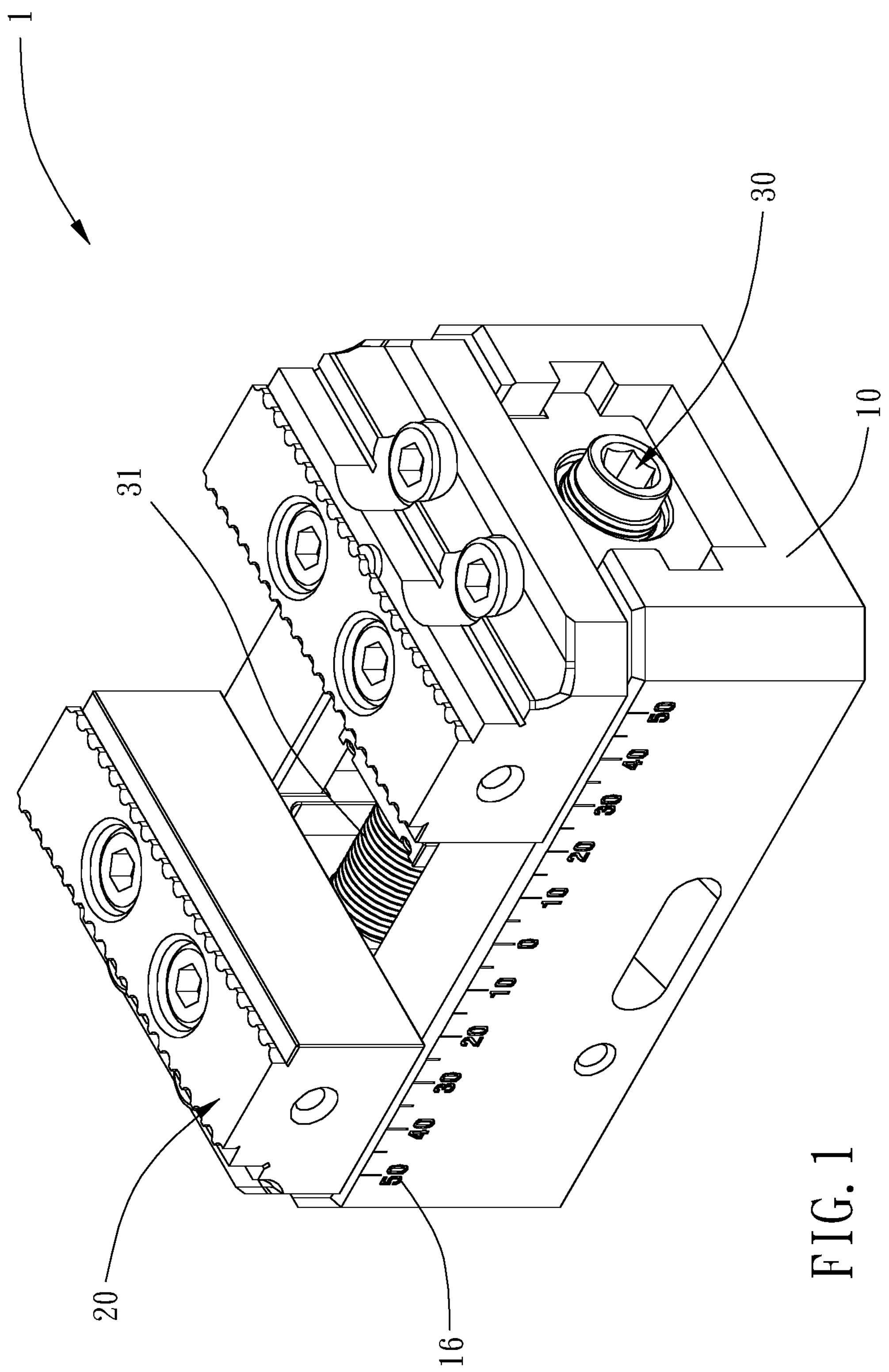
FIG. 1 is a stereogram of a preferable embodiment of the present invention.
Figure 2:
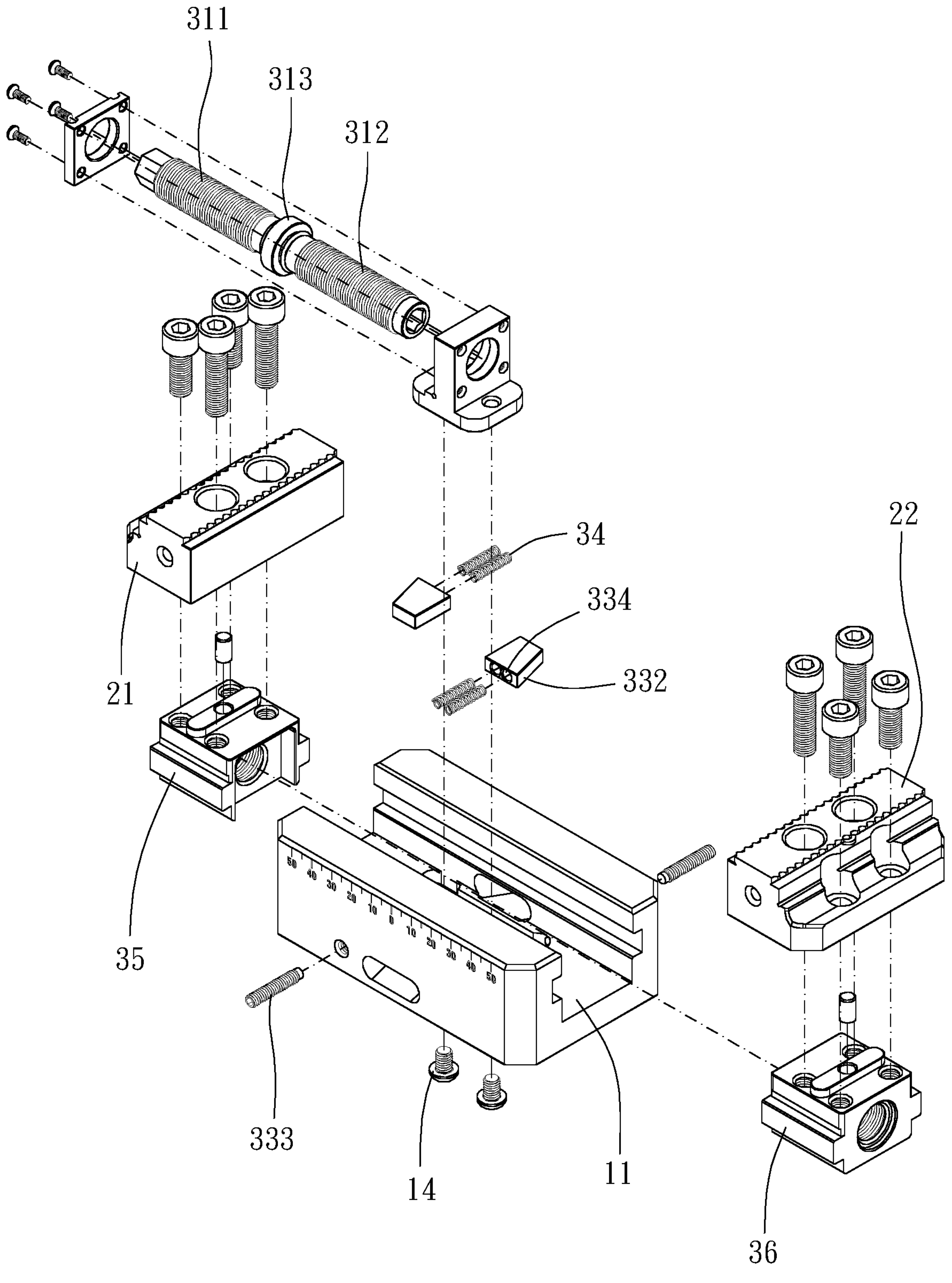
FIG. 2 is a breakdown drawing of a preferable embodiment of the present invention.
Figure 3:
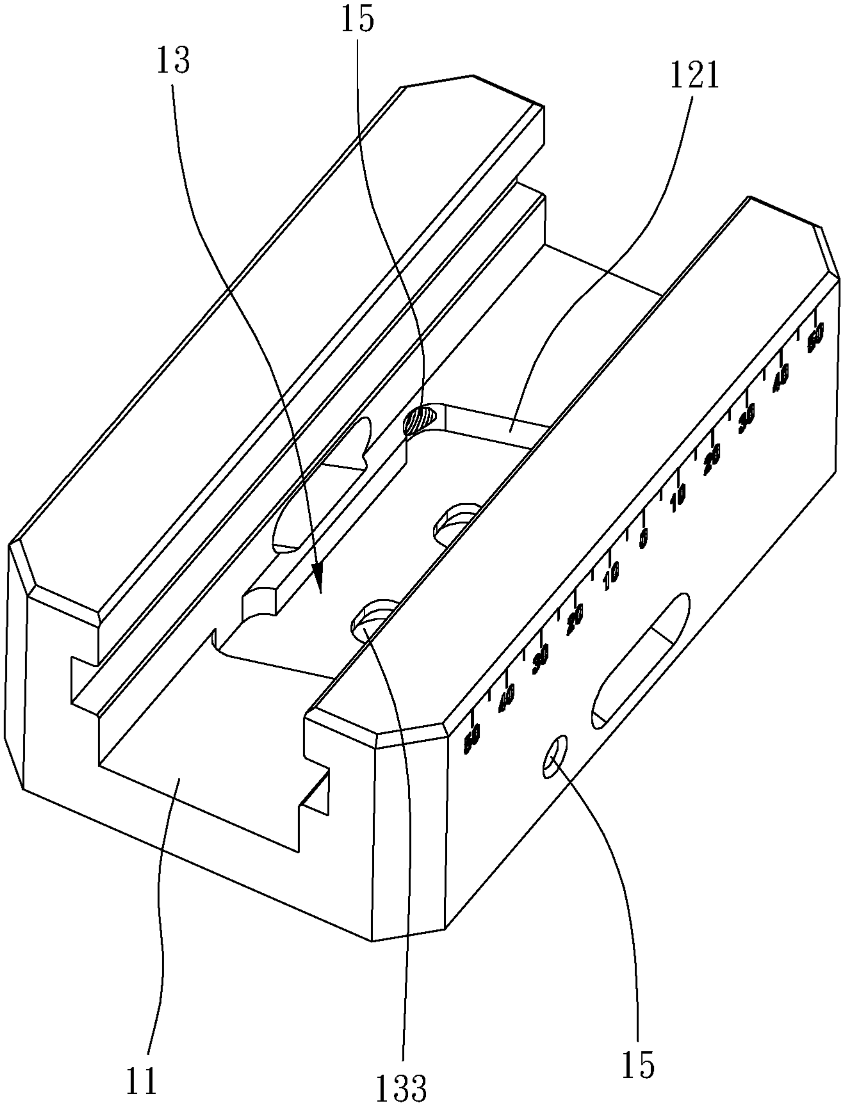
FIG. 3 is a stereogram showing a base according to a preferable embodiment of the present invention.
Figure 4:
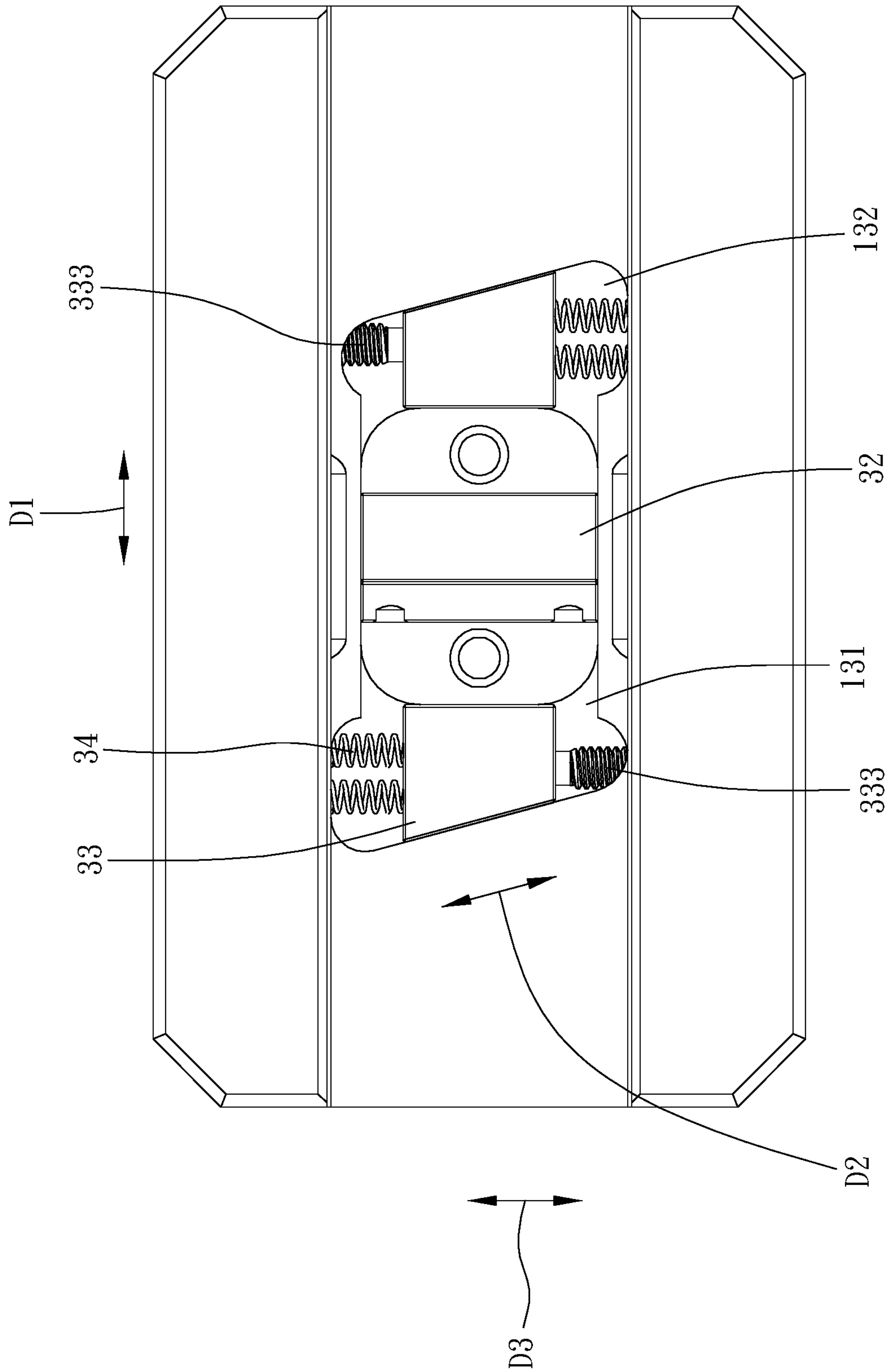
FIGS. 4-6 are drawings showing operation of a positioning member and two adjusting members according to a preferable embodiment of the present invention.

Please refer to FIGS. 1 to 6 for a preferable embodiment of the present invention. A centering vice 1 of the present invention includes a base 10, a clamp assembly 20 and an adjusting assembly 30.

The base 10 includes a sliding groove 11 extending in a first direction D1 and a first abutting portion 12. The clamp assembly 20 includes a first jaw portion 21 and a second jaw portion 22 which are movable relative to each other in the first direction D1. The adjusting assembly 30 is disposed within the sliding groove 11 and includes a threaded rod 31, a positioning member 32 and two adjusting members 33, and the threaded rod 31 includes a first threaded segment 311, a second threaded segment 312 and a positioning portion 313. The first jaw portion 21 and the second jaw portion 22 are connected respectively to the first threaded segment 311 and the second threaded segment 312, and the positioning member 32 is immovably connected to the positioning portion 313 and disposed between the two adjusting members 33. The two adjusting members 33 respectively have a second abutting portion 331 abutted against the first abutting portion 12. The two adjusting members 33 are at least partially movable relative to the base 10 in a second direction D2 lateral to the first direction D1 to urge the positioning member 32 to move in the first direction D1. Therefore, a clamping center of the clamp assembly 20 is adjustable to be aligned with a machining center of a machining tool so as to provides good machining accuracy.

The adjusting assembly 30 further includes a first slider 35 screwed on the first threaded segment 311 and a second slider 36 screwed on the second threaded segment 312, and the first slider 35 and the second slider 36 are movably disposed within the sliding groove 11. The first jaw portion 21 and the second jaw portion 22 are detachably connected respectively with the first slider 35 and the second slider 36 so that the first jaw portion 21 and the second jaw portion 22 are replaceable to meet different requirements. Spiral directions of the first threaded segment 311 and the second threaded segment 312 are opposite to each other so that the first jaw portion 21 and the second jaw portion 22 are moved toward or away from each other when the threaded rod 31 is rotated. Preferably, the base 10 has at least one scale mark 16 corresponding to the first jaw portion 21 and the second jaw portion 22, which is convenient to accurately adjust a distance between the first jaw portion 21 and the second jaw portion 22.

The base 10 further includes a concave portion 13 disposed on a bottom wall of the sliding groove 11, and the positioning member 32 and the two adjusting members 33 are received within the concave portion 13. Specifically, the first abutting portion 12 includes two inclined guiding surfaces 121 extending in the second direction D2, and the two inclined guiding surfaces 121 are located at an inner circumferential wall of the concave portion 13 and spaced apart from each other in the first direction D1, which allows the two adjusting members 33 to be stably moved along the two inclined guiding surfaces 121. Please refer to FIG. 4, the two inclined guiding surfaces 121 are preferably parallel to each other so as to keep equidistant with each other in the second direction D2, and the two adjusting members 33 and the positioning member 32 are stably and adjacently abutted against one another and between the two inclined guiding surfaces 121. The concave portion 13 includes a first portion 131 receiving the positioning member 32 and two second portions 132 receiving the two adjusting members 33, and the two second portions 132 are gradually broadened respectively toward two opposite directions in the second direction D2 so as to guide the two adjusting members 33 to be stably moved within the two second portions 132 in the second direction D2. A bottom surface of the concave portion 13 has two elongated holes 133, and two fasteners 14 respectively penetrate through the two elongated holes and detachably connect the positioning member 32 with the base 10 so as to restrict the positioning member 32 after adjustment and avoid unexpected movement.

Each of the two adjusting members 33 includes a push block 332 having the second abutting portion 331 disposed thereon and a push rod 333 connected with the push block 332, and each said push rod 333 is adjustably positioned on the base 10. In this embodiment, the base 10 has two threaded holes 15 communicated respectively with the two second portions 132, and each said push rod 333 is a threaded rod screwed within one of the two threaded holes 15, which allows the two adjusting members 33 to be slightly adjusted for good accuracy. The push block 332 of each of the two adjusting members 33 is a wedge block and is movable relative to one said push rod 333, and each said second abutting portion 331 is a surface of one said wedge block extending in the second direction D2, which has a simple structure and provides stable abutment with one another. Each of the two second portions 132 is broadened in a direction remote from one of the two threaded holes 15 so that the first abutting portion 12 and the second abutting portion 331 of each of the two adjusting members 33 can correspond to and be firmly abutted against each other.

When the push rod 333 of one of the two adjusting members 33 is moved in a third direction D3 vertical to the first direction D1, the push rod 333 drives one said push block 332 to move in the second direction D2, and the second direction D2 is oblique to the third direction D3. Therefore, the two adjusting members 33 effectively urge the positioning member 32 to move, and a structure of the adjusting assembly 30 is simple and convenient to be processed. Preferably, each of the two adjusting members 33 and the base 10 has at least one elastic member 34 disposed therebetween, and each of the at least one elastic member 34 is elastically abutted against a side of one said push block 332 remote from one said push rod 333, which allows each said push block 332 to keep in contact and be co-movable with one said push rod 333. Each said push block 332 has at least one receiving groove 334 receiving the at least one elastic member 34 therewithin so as to prevent the at least one elastic member 34 from being disengaged unexpectedly. In other embodiments, each said push block may be integrally formed as a part of one said push rod; each said push rod may be positioned on the base in other manners.

Figure 5:
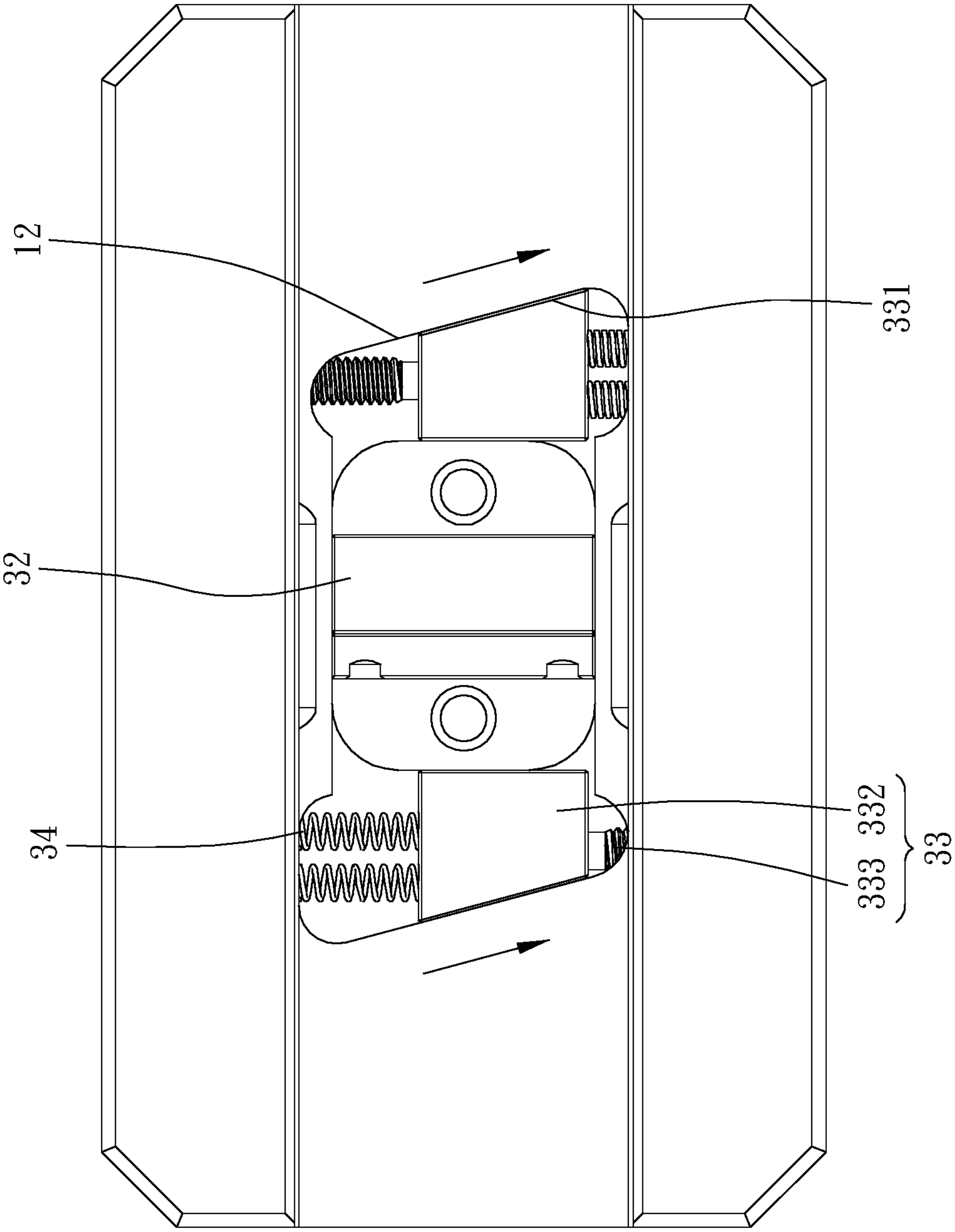
Figure 6:
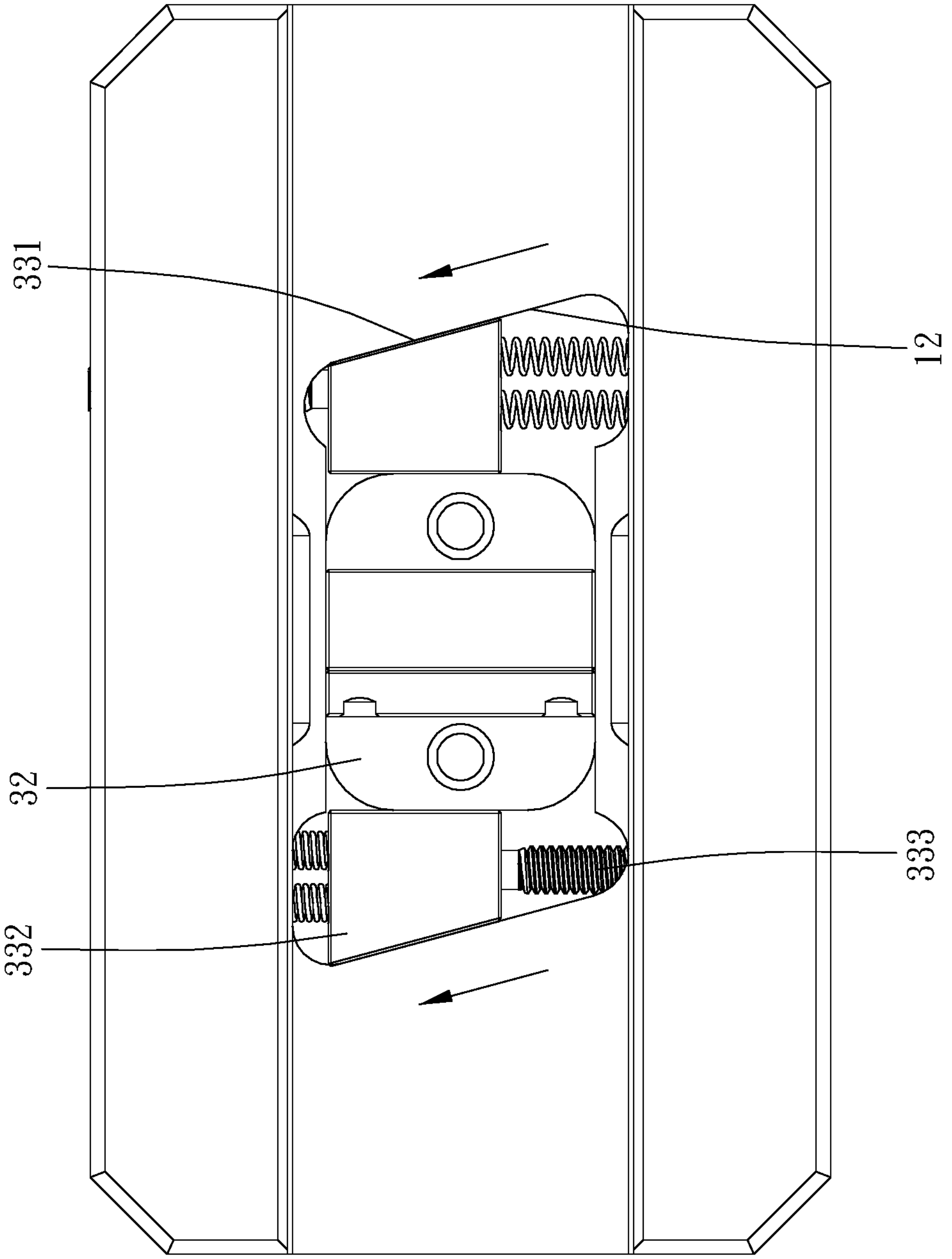

Preferably, said push rods 333 of the two adjusting members 33 are arranged diagonally relative to the positioning member 32 so that the positioning member 32 can be urged evenly by the two adjusting members 33 and be moved smoothly. In the third direction D3, a width of each said push block 332 is larger than or equal to ⅓ of a width of the positioning member 32 for stable abutment. In the third direction D3, each said push block 332 is partially overlapped with a side wall of the first portion 131 so as to restrict a movable distance of each said push block 332. Please refer to FIGS. 5 and 6, for adjusting a position of the positioning member 32, an operator should loosen the two fasteners 14 first, and one of the two adjusting members 33 is moved in a direction remote from one of the two threaded holes 15 so that the positioning member 32 is movable in the first direction D1. After that, the other of the two adjusting members 33 is rotated to urge the positioning member 32 to move to a predetermined position in the first direction D1 and restrict by the two adjusting members 33. For example, in this embodiment, to position the positioning member 32 on a right side of the base 10, one of the two adjusting members 33 located at a right side of the positioning member 32 is moved in a direction remote from one of the two threaded holes 15, and the other of the two adjusting members 33 located at a left side of the positioning member 32 is moved in a direction toward the other of the two threaded holes 15 so as to urge the positioning member 32 to move to the right side of the base 10. After that, the adjusting member 33 located at the right side of the positioning member 32 is moved in a direction toward one of the two threaded holes 15 to restrict the positioning member 32, as shown in FIG. 5, and the two fasteners 14 are screwed to the positioning member 32, and vice versa. With the configuration as described above, the two adjusting members 33 stably urge the positioning member 32, which provides good structural stability and is easy to be adjusted; the two adjusting members 33 is laterally disposed on the base 10, which is convenient to be processed.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A centering vice, including:

a base, including a sliding groove extending in a first direction and a first abutting portion;

a clamp assembly, including a first jaw portion and a second jaw portion which are movable relative to each other in the first direction; and an adjusting assembly, disposed within the sliding groove, including a threaded rod, a positioning member and two adjusting members, the threaded rod including a first threaded segment, a second threaded segment and a positioning portion, the first jaw portion and the second jaw portion being connected respectively to the first threaded segment and the second threaded segment, the positioning member being immovably connected to the positioning portion and disposed between the two adjusting members, the two adjusting members respectively having a second abutting portion abutted against the first abutting portion;

wherein the two adjusting members are at least partially movable relative to the base in a second direction lateral to the first direction to urge the positioning member to move in the first direction;

wherein the base further includes a concave portion disposed on a bottom wall of the sliding groove, and the positioning member and the two adjusting members are received within the concave portion.

2. The centering vice of claim 1, wherein the first abutting portion includes two inclined guiding surfaces extending in the second direction, and the two inclined guiding surfaces are located at an inner circumferential wall of the concave portion and spaced apart from each other in the first direction.

3. The centering vice of claim 1, wherein the concave portion includes a first portion receiving the positioning member and two second portions receiving the two adjusting members, and the two second portions are gradually broadened respectively toward two opposite directions in the second direction.

4. The centering vice of claim 1, wherein each of the two adjusting members and the base has at least one elastic member disposed therebetween.

5. The centering vice of claim 1, wherein each of the two adjusting members includes a push block having the second abutting portion disposed thereon and a push rod connected with the push block, and each said push rod is adjustably positioned on the base.

6. The centering vice of claim 5, wherein the push block of each of the two adjusting members is a wedge block, and each said second abutting portion is a surface of one said wedge block extending in the second direction.

7. The centering vice of claim 5, wherein when the push rod of one of the two adjusting members is moved in a third direction vertical to the first direction, the push rod drives one said push block to move in the second direction, and the second direction is oblique to the third direction.

8. The centering vice of claim 3, wherein the first abutting portion includes two inclined guiding surfaces extending in the second direction, and the two inclined guiding surfaces are located at an inner circumferential wall of the concave portion and spaced apart from each other in the first direction; the two inclined guiding surfaces are parallel to each other; a bottom surface of the concave portion has two elongated holes, two fasteners penetrate respectively through the two elongated holes and detachably connect the positioning member with the base; each of the two adjusting members and the base has at least one elastic member disposed therebetween; each of the two adjusting members includes a push block having the second abutting portion disposed thereon and a push rod connected with the push block, and each said push rod is adjustably positioned on the base; the push block of each of the two adjusting members is a wedge block, and each said second abutting portion is a surface of one said wedge block extending in the second direction; when the push rod of one of the two adjusting members is moved in a third direction vertical to the first direction, the push rod drives one said push block to move in the second direction, and the second direction is oblique to the third direction; in the third direction, a width of each said push block is larger than or equal to ⅓ of a width of the positioning member; the base has two threaded holes communicated respectively with the two second portions, each said push rod is a threaded rod screwed within one of the two threaded holes; each of the two second portions is broadened in a direction remote from one of the two threaded holes; in the third direction, each said push block is partially overlapped with a side wall of the first portion; each of the at least one elastic member is elastically abutted against a side of one said push block remote from one said push rod; each said push block has at least one receiving groove receiving the at least one elastic member therewithin; spiral directions of the first threaded segment and the second threaded segment are opposite to each other; the adjusting assembly further includes a first slider screwed on the first threaded segment and a second slider screwed on the second threaded segment, the first slider and the second slider are movably disposed within the sliding groove, the first jaw portion and the second jaw portion are detachably connected respectively with the first slider and the second slider; and the base has at least one scale mark corresponding to the first jaw portion and the second jaw portion.

* * * * *